United States Patent [19]
Southworth

[11] Patent Number: 5,816,589
[45] Date of Patent: Oct. 6, 1998

[54] SAND SURF BOARD

[75] Inventor: Michael J. Southworth, Mesa, Ariz.

[73] Assignee: Dunesport Corporation, Chandler, Ariz.

[21] Appl. No.: 723,064

[22] Filed: Oct. 1, 1996

[51] Int. Cl.⁶ .................................................. A63C 5/00
[52] U.S. Cl. ........................................ 280/14.2; 280/607
[58] Field of Search ..................... 441/65, 74; 280/14.2, 280/610, 607, 609, 608, 87.041, 19, 87.042; 156/210

[56] References Cited

U.S. PATENT DOCUMENTS

| | | | |
|---|---|---|---|
| 2,424,694 | 7/1947 | Jones | 280/19 |
| 3,928,106 | 12/1975 | Molnar | 156/210 |
| 4,925,417 | 5/1990 | Warren | 441/65 |
| 5,083,809 | 1/1992 | Stampacchia | 280/14.2 |
| 5,127,862 | 7/1992 | Pia | 441/65 |

*Primary Examiner*—Richard M. Camby

[57] ABSTRACT

An integral sand ski for carrying a towed user skiing on sand for exerting a forward force vector from a tow rope held by the user through and in general alignment with skeletal bones of the user comprising a ski board having an elongate central generally flat surface for resting on and sliding on sand and a deck support above the board at an angle from the board from rear to front of about two degrees or greater.

12 Claims, 3 Drawing Sheets

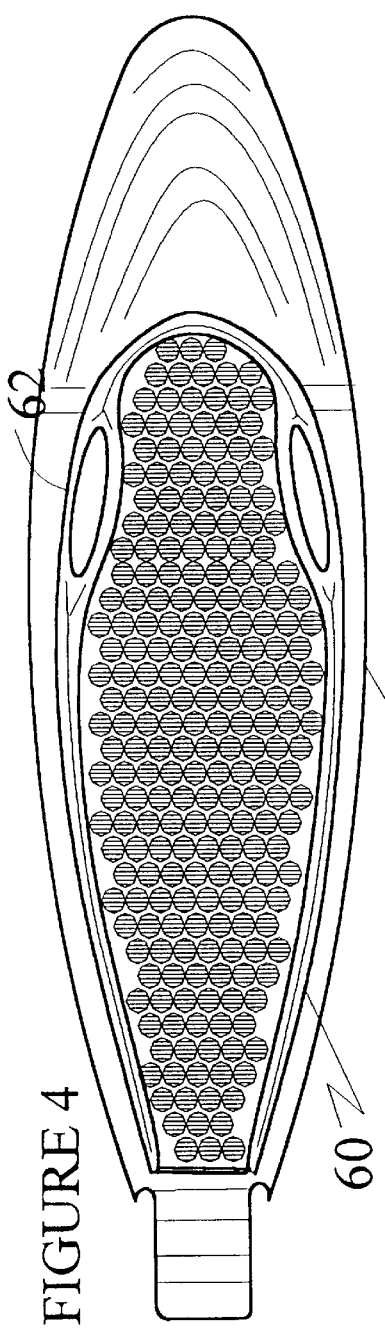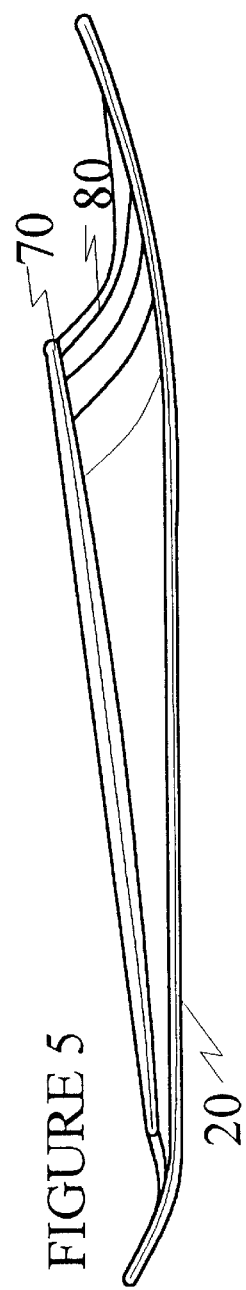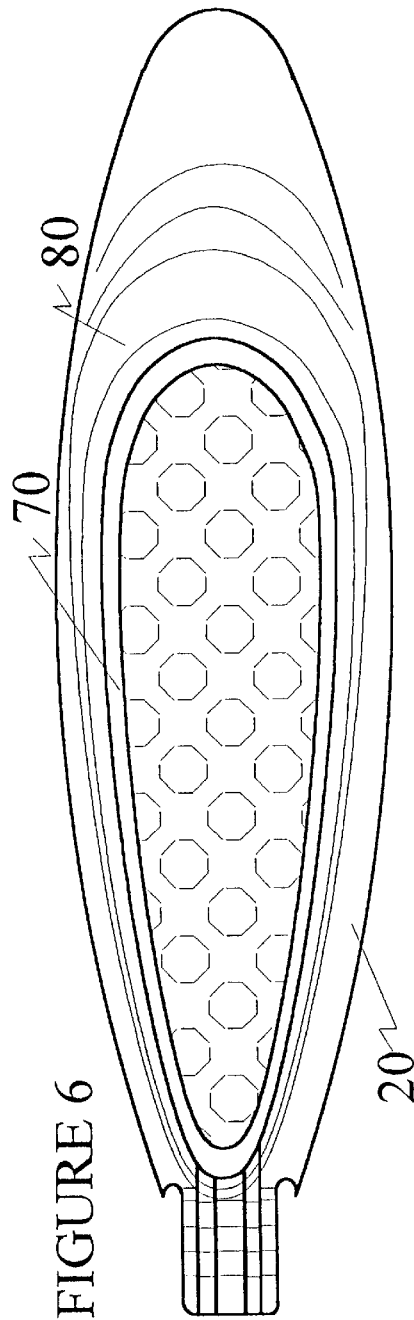

SAND SURF BOARD

FIELD OF THE INVENTION

This invention relates to recreation and sports and particularly to skis of the type that carry a rider and are towed by a motor powered boat or vehicle.

BACKGROUND OF THE INVENTION

Water skiing is a very popular sport made possible by the invention of skis that are of sufficient width and length to glide on the water surface and carry a rider when the rider is towed by a boat.

Sand dunes are found in most regions of the country and many ocean and lake beaches are formed of soft, smooth sand. Dune sports have become very popular.

Since the dawn of time, man has use sleds of various types pulled by animals and later by motor powered vehicles. The common feature of sleds is that the motive power source is connected to the sled. Skateboard riders have been known to hitch a ride on a vehicle also. The very low friction of wheeled devices makes it possible to exert sufficient force through the rider's body to the wheeled vehicle to pull the rider and the vehicle.

Some limited and unsuccessful efforts to pull a rider on a board or sled by exerting the pulling force through the rider have, presumably, been attempted.

The availability of vehicles capable of traveling over sand dunes and on soft sandy beaches, etc., would seem to invite the use of skis much as the availability of power boats invites the use of water skis; however, it has not heretofore been possible to exert sufficient forward force to skis through a tow rope and the rider to move any known skis forward in sand at a satisfactory speed.

It is an object of the present invention of provide a ski that is specially designed and constructed to permit a sufficient forward force vector through a skier's body to a ski to permit the skier to travel at relatively high speeds in sand.

SUMMARY OF THE INVENTION

A sand ski is provided comprising a surf board that preferably has an up-turned front portion and a generally flat central portion and a deck carried on the board, the deck being support on the board at an upward angle from the rear portion of the board. The upward angular relationship between the deck and the board causes the skier to lean rearwardly with his feet extending forward and down to the deck when he is pulled by a tow rope attached to a vehicle such that a substantial portion of the forward force vector is on the sand ski.

In one embodiment, the invention is formed as an integral sand ski for carrying a towed user skiing on sand. The body is constructed and configured to form a ski board having a front portion, a central portion, and a rear portion, constructed to define an elongate central generally flat surface for resting on and sliding on sand, the front portion being upturned from the central portion. The body also forms a deck constructed and configured to support a user and means supporting the deck above the board at an angle from the board from rear to front of about two degrees or greater. In all embodiments, the body is so constructed and configured that a forward force vector from a tow rope held by the user is transmitted through and in general alignment with skeletal bones of the user. The body is preferably formed of a self-lubricating polymer, such as polyethylene or polyurethane. The body may be filled with a polymeric foam material, e.g. polyurethane foam, to enhance structural integrity. In one embodiment, the deck is supported at an angle of about four plus or minus two degrees, and for skilled users, the deck may be supported at an angle of more than four degrees, up to as high as thirty degrees in some instances.

BRIEF DESCRIPTION OF THE DRAWINGS

FIG. 4 is a top plan view of a second embodiment of the invention, differing from FIG. 1 in the construction of the deck to define handles.

FIG. 5 is a side elevational view of a third embodiment of the invention showing another deck structure.

FIG. 6 is a top plan view of the embodiment of FIG. 5.

DESCRIPTION OF THE PREFERRED EMBODIMENTS

The drawings depict three of a virtually infinite number of forms in which the invention may be constructed and exemplify, but do not limit, the invention as defined in the claims.

Various materials are described in relation to the manufacture of the invention but materials per se are not critical to the invention and many materials are available from which the various components and structures may be fabricated.

Typically, any of several kinds of devices would be attached to the deck to receive and secure the placement of the user's feet. One common type of foot binding device comprises fabric straps which encircle the foot and which are fastened with hook-and-loop fasteners of the type sold by 3M company under its VELCRO® trademark. Such devices are not part of the invention, however, and have been omitted to better illustrate the essential features of the invention.

Figure 1:
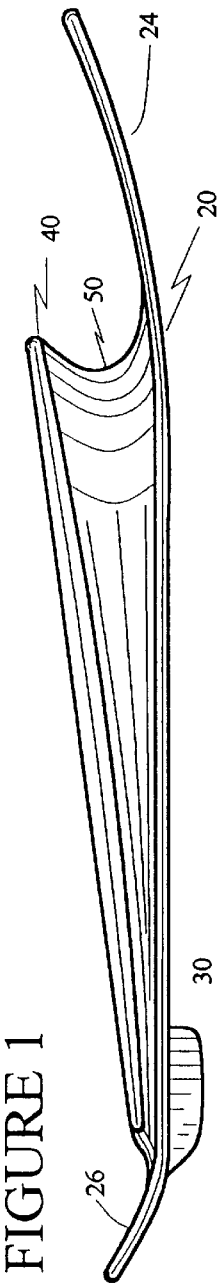
FIG. 1 is a side elevational view of one embodiment of the invention showing the angled relationship between the riding deck and the surfing board and other desirable, but not essential, structural relationships.
Figure 2:
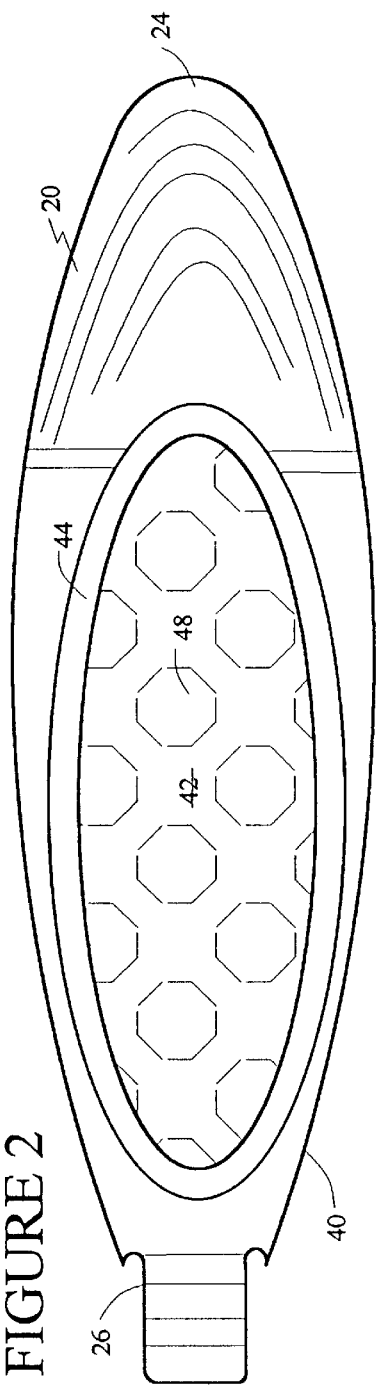
FIG. 2 is a top plan view of the embodiment shown in FIG. 1.
Figure 3:
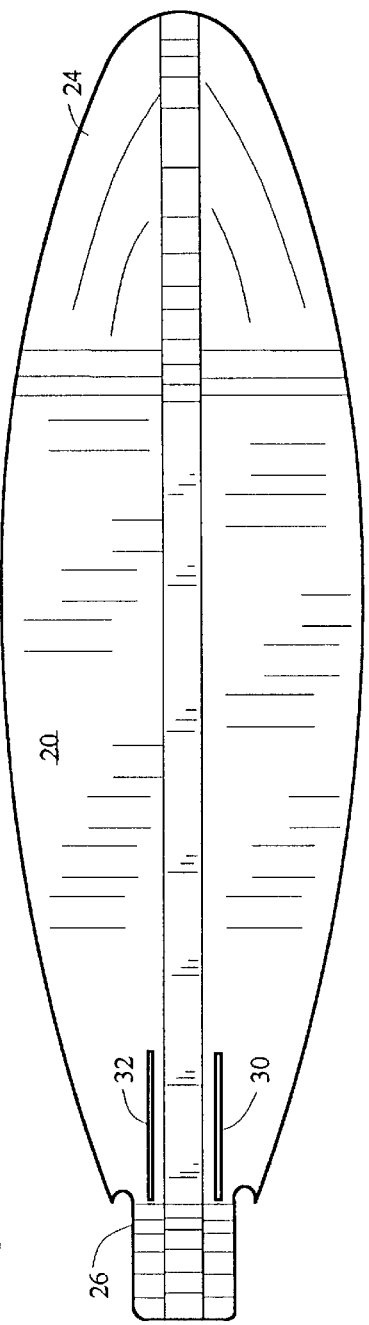
FIG. 3 is a plan view of the bottom of the embodiment of FIG. 1 which is typical of the bottom of other embodiments shown in subsequent figures.

Referring first to FIGS. 1–3, the essential structures of the invention are the surfing board 20 and the deck 40 and means for supporting the deck on the board at an upward angle from the rear to toward the front.

Figure 7:
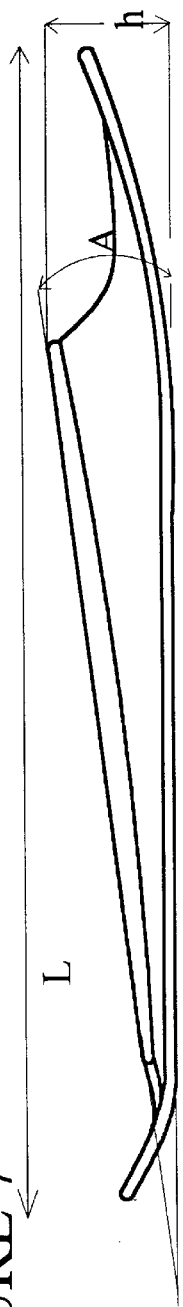
FIG. 7 is a side view of the embodiment of FIGS. 5 and 6 in simplified form with angles and dimensions to aid in describing the invention.

Reference is made briefly to FIG. 7, in connection with FIGS. 1–3, to describe the angular and dimensional relationships. While the dimensions of the board and deck can vary over a range, there are certain critical ranges for optimum performance. The board can be as short as about three feet or as long as six feet, or somewhat more, the optimum length, shown by the line L in FIG. 7, is about four feet. The deck should be at least about one and one-half feet and can be nearly as long as the board; however, the optimum length is from about two to about three feet. The deck is typically about one-third to two-thirds the length of the board. Deck is inclined from the rear toward the front of the board with respect to the board. The optimum inclination angle, Angle A, as shown in FIG. 7, is about four degrees, but angles from about two degrees to about high as seven to ten degrees are quite suitable. Higher angles may be used by very skilled users. The entire deck my be elevated above the board, or the rear of the deck may merge into the deck. The highest point of the deck, the distance H in FIG. 7, is typically from four to seven inches from the bottom of the board; however, this is not a critical dimension. The width of the board is optimally from about one to about one and one-half feet. Typically, the width of the board will be up to about one-third the length of the board.

Figure 8:
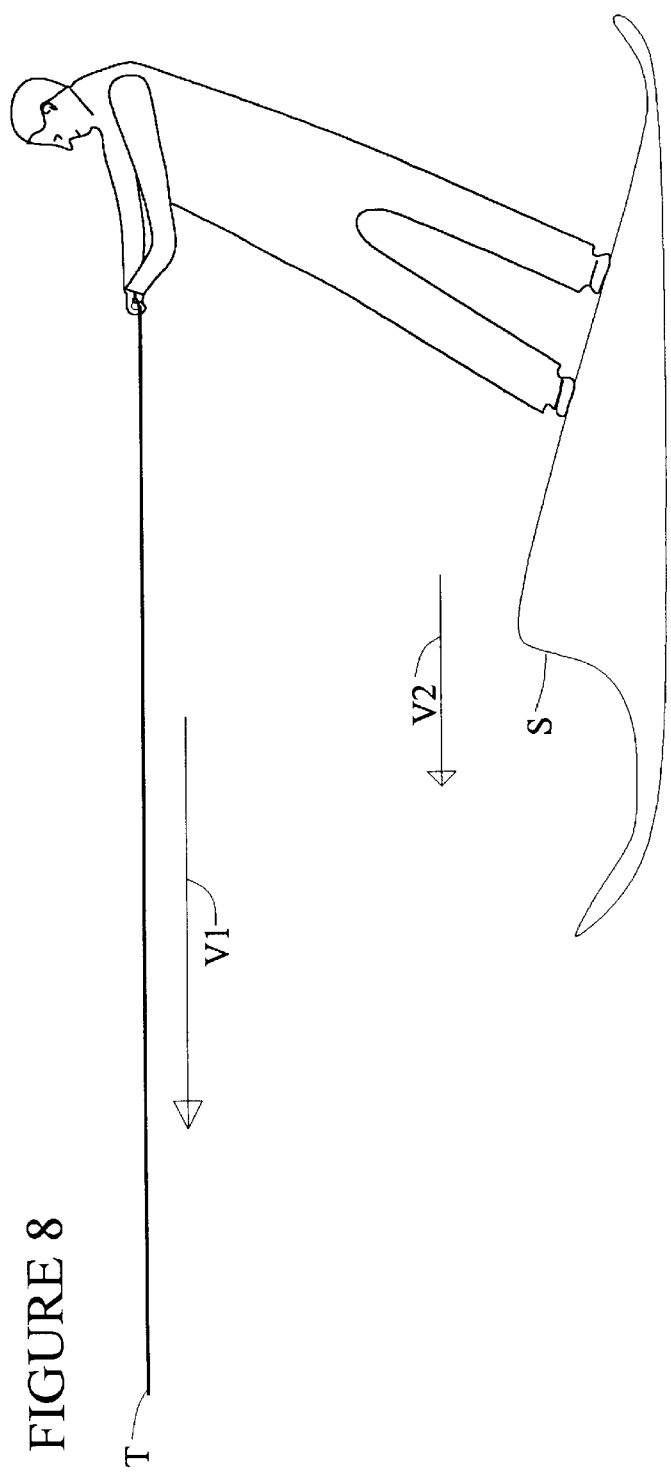
FIG. 8 is a schematic vector diagram illustrating the application of a forward force vector from a tow rope to the sand ski.

In use, the sand skier grasps the end of a tow rope that is connected at the other end to a dune buggy or other vehicle. The sand skier may stand facing forward or facing sideways on the board in a manner generally as illustrated in FIG. 8. The skier stands generally perpendicular to the deck, thus leaning backwardly in reference to the sand and the tow vehicle. The skier may, of course, lean further backwardly of the ski if desired. With the deck being support on the board at an upward angle from the rear portion of the board, when the skier is pulled by a tow rope T attached to a vehicle, not shown, a substantial portion of the forward force vector V1 is transmitted through the skier to the sloping deck, thus exerting a forward force vector V2 is applied to the sand ski. Without this angular relationship, insufficient forward force vector would be exerted on the ski to overcome the friction of the sand, or would have to be transmitted as a side ways force on the users legs, knees and ankles—obviously an undesirable circumstance. With the sand ski of this invention, the forward vector is transmitted in generally alignment with the skeletal bone structure of the user.

Making continued reference to FIGS. 1–3, it will be seen that the board 20 comprises a center portion 22 which generally has a flat center. Slight curvature is entirely satisfactory, and may be desirable in certain instances. A front portion 24 curves upward so as to terminate the front of the board about two to four inches above the center portion 22. The upward curvature is important but the degree or height of curvature are not critical. The front portion desirably tapers inwardly to a curved front end, but this feature is not critical. The bottom of the board may be flat laterally or it may slope from the center slightly upwardly toward the sides of the board.

A sharply upwardly extending rear ramp 26 is a desirable feature for turning the board, etc., but is not crucial to the use of the board.

Optionally, a pair of guide fins 30 and 32 may extend downwardly from the rear of the center portion of the board. One or more fins of conventional structure may be used. Such fins are typically about two to five inches in length, one to three inches high, and, typically, are detachably fitted in slots in the bottom of the board. The fins are an optional and noncritical feature of the invention.

The deck 40 comprises a generally planar structure of, preferably, generally oval or elliptical configuration, the outer configuration not being critical. In the preferred embodiment, the deck 40 is so constructed and configured as to define a generally flat central area 42 and a rim 44. The recess is preferably covered with a resilient layer 46 that is decorative and soft to the touch for comfort. The resilient layer is desirably configured to define a pattern of raised portions 48. Any pattern may, of course be used.

The deck is supported above the board at an angle as previously described by a generally wedge-shaped support structure 50 or one or more vertical supports. In FIGS. 1–3, the support structure 50 is generally in the form of a wedge with recessed peripheral portions. Other than the requirement that the support 50 support the deck above the board at the proper angle, the remaining features may be configured in any visually attractive configuration.

FIG. 4 depicts a variation of the embodiment of FIGS. 1–3, the deck 60 being so constructed and configured as to define one or more handles, such as are shown at 62 and 64. Except for the structure defining the handles, the deck 60 is constructed and supported on the board in generally the same manner as has been described with respect for FIGS. 1–3.

FIGS. 5 and 6 depict another deck construction and support structure. The deck 70 is configured differently from the configuration of the previous figures, being narrow at the rear; however, the deck 70 is generally constructed as previously described. The support structure 80 differs from that depicted in the previous figures. The support structure defines an outwardly curved slope downwardly to the board. This outward curvature is aesthetically appealing but not structurally critical. As previously described, any support structure that positions the deck above the board in the proper position and angular relationship may be used.

The sand surfer of this invention may be constructed of any material, or group of material that has sufficient strength to support a person on the deck and withstand abrasion and impact forces during use. Manufacturing materials and methods in common use in the manufacture of jet skis, water skis, etc., may quite satisfactorily used to fabricate the present invention.

In one preferred form, the entire outer structure of the sand surfer, except the fins, is rotationally molded of high strength, high impact polyethylene or polyurethane to form a hollow body. Rigid polyurethane foam, or other material, is then injected to fill the cavity in the body to increase dimensional stability and increase strength. Fiber reinforced ABS resins may likewise be used. The deck covering 46 may be a preformed pad of resilient foam adhesively bonded to the deck or it may be a resilient polyurethane foamed-in-place layer. This is merely one example of the many kinds of materials and methods of construction that may be used to make the invention.

The sand surfer is used very much the same way that a conventional water ski or board is used in the water, except that the pulling force is a vehicle rather than a boat. The sand surfer may, of course, also be used in water. The rider positions himself on the sand surfer, grasps a tow rope attached to a vehicle. As the vehicle moves, the pulling force is exerted through the riders body and legs generally in alignment with the bones such that, due to the angled deck, a forward force vector is exerted on the board. In the absence of an angled deck, virtually no forward force vector would be exerted on the board. This is a fundamental and critical concept of the invention.

It will be seen from the foregoing that the invention is a ski, or sand surfer, constructed and configured to carry a towed user for skiing on sand. The user would normally be towed by a long tow rope attached to a dime buggy. The sand ski comprises a ski board having a front portion, a central portion, and a rear portion, constructed to define an elongate central generally flat surface for resting on and sliding on sand, the front portion being upturned from the central portion. A deck constructed and configured to support a user is supported above flat central portion of the board at an angle from the board from rear to front of about two degrees or greater; preferably at about four degrees, and if desired, at a higher angle. The ski is constructed and configured such that the user, standing straight and perpendicular to the deck stands at an angle relative to the board such that a forward force vector from a tow rope held by the user is transmitted through and in general alignment with skeletal bones of the user to the ski. The rear portion may also be upturned, and fins may be attached to the bottom of the board.

It will be seen from the foregoing that the dimensional and angular features of the invention are critical even though any of a family of dimensions and angles may be used. Within these constraints, the materials and structures may varied with great latitude.

INDUSTRIAL APPLICATION

This invention is useful in the recreation industry.

I claim:

1. A ski constructed and configured to carry a towed user for skiing on sand comprising:
    a ski board (20) having a front portion, a central portion, and a rear portion, constructed to define an elongate central generally flat for resting on and sliding on sand, the front portion being upturned from the central portion;
    a deck (40) constructed and configured to support a user; and means supporting the deck (40) above the board (20) at an angle from the board from rear to front of about two degrees or greater;
    whereby a forward force vector from a tow rope held by the user is transmitted through and in general alignment with skeletal bones of the user.

2. The ski of claim 1 wherein the rear portion is upturned.

3. The ski of claim 1 wherein the deck is supported at an angle of about four degrees or more relative to the central portion of the board.

4. The ski of claim 3 wherein the rear portion is upturned.

5. The ski of claim 3 further comprising fins attached adjacent the rear of the board.

6. The ski of claim 5 wherein the rear portion is upturned.

7. An integral sand ski for carrying a towed user skiing on sand for exerting a forward force vector from a tow rope held by the user through and in general alignment with skeletal bones of the user, said ski comprising a body constructed and configured to form a ski board (20) having a front portion, a central portion, and a rear portion, constructed to define an elongate central generally flat surface for resting on and sliding on sand, the front portion being upturned from the central portion, a deck (40) constructed and configured to support a user and means supporting the deck (40) above the board (20) at an angle from the board from rear to front of about two degrees or greater.

8. The sand ski of claim 7 wherein the body is formed of a self-lubricating polymer.

9. The sand ski of claim 8 wherein the polymer is polyethylene or polyurethane.

10. The sand ski of claim 9 wherein the deck is supported at an angle of about four plus or minus two degrees.

11. The sand ski of claim 9 wherein the deck is supported at an angle of more than four degrees.

12. The sand ski of claim 9 wherein the body is filled with a polymeric foam material.

* * * * *